United States Patent [19]
Wiley

[11] Patent Number: 6,095,884
[45] Date of Patent: Aug. 1, 2000

[54] GAME CALL

[75] Inventor: William Thomas Wiley, 107 Herbert St., Starkville, Miss. 39759

[73] Assignee: William Thomas Wiley, Starkville, Miss.

[21] Appl. No.: 09/273,969

[22] Filed: Mar. 22, 1999

Related U.S. Application Data

[63] Continuation-in-part of application No. 08/935,359, Sep. 22, 1997, abandoned.

[51] Int. Cl.[7] .............................. A63H 5/00; A01M 31/00
[52] U.S. Cl. .......................... 446/208; 446/202; 446/206
[58] Field of Search ..................................... 446/202–208, 446/397, 193

[56] References Cited

U.S. PATENT DOCUMENTS

| | | |
|---|---|---|
| 387,338 | 8/1888 | Canney . |
| 403,702 | 5/1889 | Sellers . |
| 2,781,558 | 2/1957 | Harley . |
| 5,613,891 | 3/1997 | Lamo ........................................ 446/26 |

*Primary Examiner*—Robert A. Hafer
*Assistant Examiner*—Laura Fossum

[57] ABSTRACT

A device, for calling a variety of game having different instinctive calls, including a first flexible and elastic tube having vibrating means seated in one end thereof and further including a second flexible tube in which the vibrating means and the one end of the first flexible tube are engaged. Turbulent air passing through the first and second tube causes the vibrating means to generate a sound which may be altered in tone, pitch, resonance, and volume by radial deformation or linear bending of either or both the first or second flexible and elastic tubes.

10 Claims, 4 Drawing Sheets

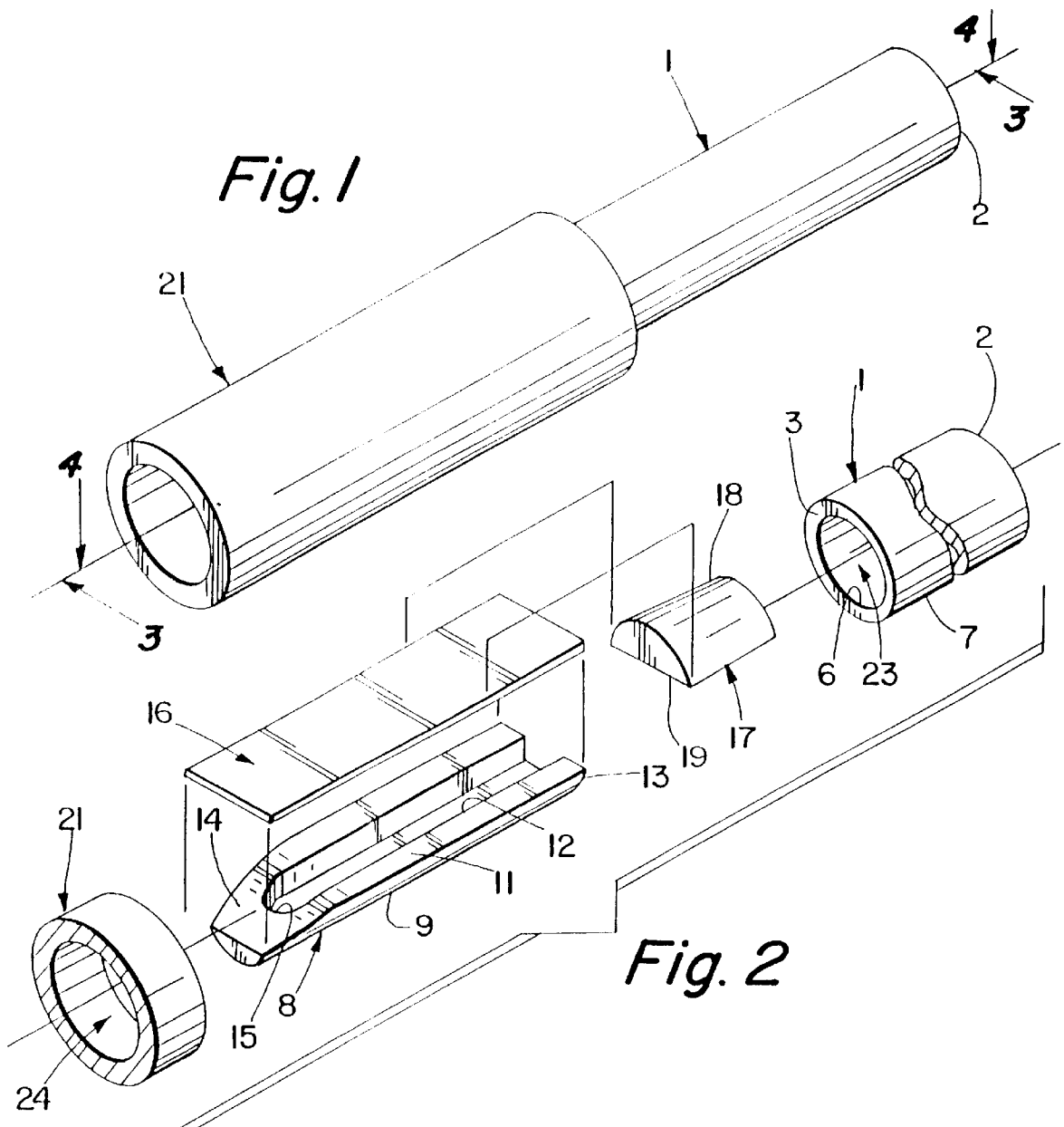
Fig. 1
Fig. 2
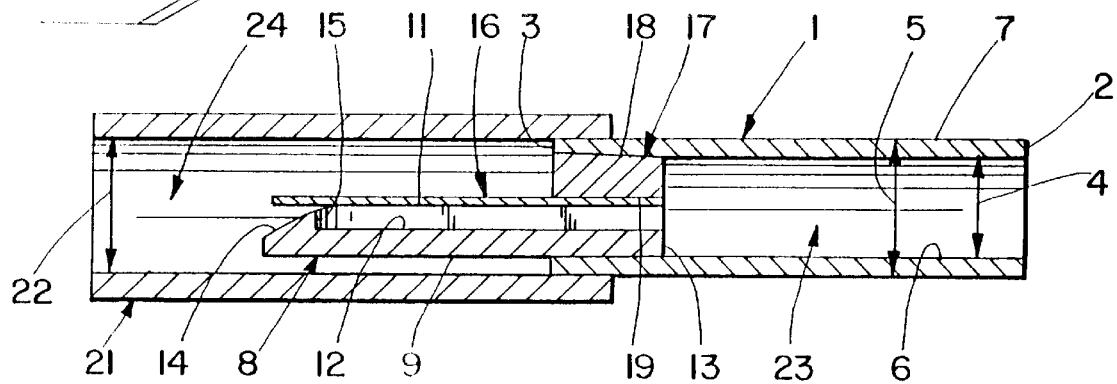
Fig. 3

GAME CALL

This is a continuation in part of application Ser. No. 08/935,359 filed Sep. 22, 1997, now abandoned

FIELD OF THE INVENTION

The present invention relates to devices for creating sound. More particularly, the present invention relates to devices for creating sounds similar to those produced by a variety of animal species and in even greater particularity, the present invention relates to devices for generating animal sounds wherein a variety of animal sounds may be generated from a singular device.

BACKGROUND OF THE INVENTION

Game call devices are available on the market in several styles and combinations. Most operate under the general concept of a vibrating reed agitated by the flow of air through a tubular device in which the vibrating reed is encased. In most circumstances, existing game calls include rigid devices shaped to create a specific resonance of the sound generated by the vibrating reed thus in turn creating a specific animal call. The sound and volume generated by such a rigid device can be altered by a skilled game caller who, by manipulating the amount of air discharged into the device and the sound emanating from the human vocal chords, in effect creates a human resonance chamber separate and apart from that provided by the game call device. Further, many skilled game callers are able to manipulate the sound discharged from the game device by cupping their hands in various specific fashion around the discharge end of the game device to manipulate the sounds and volume emanating therefrom. The skills necessary to operate a rigid game call in the manner described may take years of practice to accomplish.

In an effort to create game calls whereby an inexperienced hunter can manipulate the device to generate a variety of calls, several inventions have been created whereby the internal components of the game call are manipulated to generate a different sound. For example, U.S. Pat. No. 5,613,891 teaches a game call device with flexible tubes that incorporate interchangeable reeds and may be extended or retracted to vary the tone as well as being bent in different directions for projecting the animal call being sounded. U.S. Pat. No. 4,940,451 describes a game call with an adjustment member extending though an opening in the resonance chamber with optional resonance tubes that may be applied to the device to alter the volume of the resonance chamber. U.S. Pat. No. 5,557,946 discloses a device having a complex apparatus for compressing an elastic skin against the vibrating reed to apply pressure to the reed thus altering the degree of vibration which in turn alters the sound generated by the device.

Though these inventions teach significant improvements to the industry of game calls, the short comings of such devices is a propensity to alter the game call in an overly mechanistic manner and are unnecessarily complex. Though the inexperienced hunter can use the foregoing devices to produce a variety of sounds, such calls tend to be limited in tone and volume range. An example is U.S. Pat. No. 5,613,891 that describes different reed components that must be carried and inserted into the call to make different animal sounds and effectively increase the tone range. Also described by U.S. Pat. No. 5,613,891 are the previously mentioned flexible, bendable sounding tube that can be extended or retracted to vary the tone or pitch of the animal call. In effect this extending and retracting of the corrugated sounding tube causes the sound chamber to lengthen and shorten which in turn changes the resonance while having a very limited effect on the pitch.

What is needed is a device that can be used by a novice or experienced game caller to generate a wide range of sound; a device that may be altered in tone, pitch, resonance, and volume. What is needed is a game call that allows the caller to make multiple animal sounds and simultaneously control volume, enabling the caller to call multiple species of animals at variable distances and under variable environmental conditions, in an instant, without replacing any part of the device. What is needed is a game call whereby the novice hunter can exercise his individual artistic imagination with out the bounds of a specific mechanical device and without the necessary years of practice required to manipulate the human anatomy to generate a variety of animal sounds.

SUMMARY OF THE INVENTION

It is the principal objective of the present invention to provide a game call that may be easily used by both experienced and inexperienced users to generate a maximum variety of game sounds.

In support of the principal object, another object of the present invention is to provide a game call that permits the user to alter the tone, pitch, and resonance, of sound generated by the game call, while simultaneously controlling volume.

In support of the principal object, yet another object of the present invention is to provide a game call which allows the user to make subtle or dramatic changes in the tone, pitch, resonance, and volume of the sounds emanating from the game call such that the user can instantly, without interchanging or applying any additional parts to the device, vary the game sounds to more accurately match the natural fluctuation of wildlife calls in a particular wildlife setting.

These and other objects and advantages of the present invention are accomplished through the use of the first flexible and elastic tube having a reed holder, reed and reed positioner seated within one end thereof. A second flexible and elastic tube is connected to the first flexible tube approximate said reed such that the reed holder and reed are incased within the second flexible tube. The reed positioner, reed and reed holder effectively plug the first tube limiting air flow therethough to a channel defined between the reed holder and the reed. Air flow through the second tube and into the first tube passes through the channel and becomes turbulent and causing the reed to vibrate against the reed holder thus creating a predetermined sound.

Air flow is typically generated through the channel by blowing through the second flexible tube. The sound emanating from the game call can be altered by bending either or both the first and second flexible tubes. Linear bending of the second flexible tube increases the pitch of the sound emanating from the game call. The pitch may be increased from slightly to dramatically, or anywhere on the scale between, relative to the degree of linear bending applied to the second flexible tube. This linear bending alters the pitch as described above by bringing the interior surface of the second flexible tube in contact with the vibrating reed thus limiting the space in which the reed may vibrate. While linear bending of the second tube alters pitch, the same linear bending of the first flexible tube alters the resonance of the sound generated by the game call and is also relative to the degree of bending. In addition to linear bending, radial deformation of the first and second flexible and elastic tubes also allow the caller to control or alter the sounds emanating from the game call. Radial deformation of the second tube allows the caller to alter pitch and resonance in a similar manner by changing the inside diameter of the second tube. Again the degree of alteration is relative to the amount of radial deformation applied to the tube. While both the first and second flexible and elastic tubes are completely flexible and elastic in there entire length, the second tube being so, allows the person using the game call to use their mouth or their hands to radially deform the tube and effectively alter the sound emanating from the game call. By effectively altering the pitch and resonance as described above, with both linear bending and radial deformation, the tone range is much larger than the capabilities of existing game calls in a singular form.

When using a game call to lure the intended game animal closer to the caller the caller must often adapt to changing environmental factors and various wildlife settings such as wind, rain, hills, open fields, forest, etc. These environmental factors often cause the need to control volume of the sound generated by the game call. Also it is very difficult to anticipate the distance the game animal will present itself, thus increasing the need for volume control. As mentioned previously, simultaneous volume control is another substantial advantage provided by the present invention. Volume control is also achieved by radial deformation, although in this capacity the first flexible and elastic tube should be radially deformed. By squeezing the first tube between the thumb and index finger, or any other practical method of squeezing, the internal diameter of the first tube is decreased and effectively decreases the volume. The decrease in volume is directly related to the decrease in the internal diameter and the amount of squeezing applied to the first tube.

In addition to the advantages of tone, pitch, resonance, and volume control the present inventions elastic characteristics, or memory, allow the user to make these alterations instantly. Instant alterations are achieved by simply releasing the pressure required to cause the previously described linear bending and radial deformation and allow the game call to return to its original and straight shape. The flexible tubes are then ready to be manipulated again in any of the above mentioned methods.

Another advantage provided by the use of flexible and elastic tubes is durability. Being completely flexible and elastic in their entire length with the reed assembly encased within, renders the game call incredibly shock resistant.

An even further advantage of the present invention relates to the economical method of manufacture in that the material used for the flexible and elastic tubes is widely available and affordable.

A user, even an unskilled user of the subject invention, can create subtle alterations of game call sounds and volume only previously accomplished by an experienced game caller through the manipulation of the human vocal chords, hands, diaphragm, and mouth. The number of game call sounds the user can perform with the present invention are not limited and are as numerous as the imagination of the user.

BRIEF DESCRIPTION OF THE DRAWINGS

Apparatus embodying features of my invention are depicted in the accompanying drawings which form a portion of this disclosure and wherein:

FIG. 1 is a perspective view of the present invention of the first embodiment of the present invention;

FIG. 2 is an exploded partially broken view of the first embodiment of the present invention;

FIG. 3 is a sectional view taken along line 3—3 of FIG. 1;

DESCRIPTION OF A PREFERRED EMBODIMENT

Figure 4:
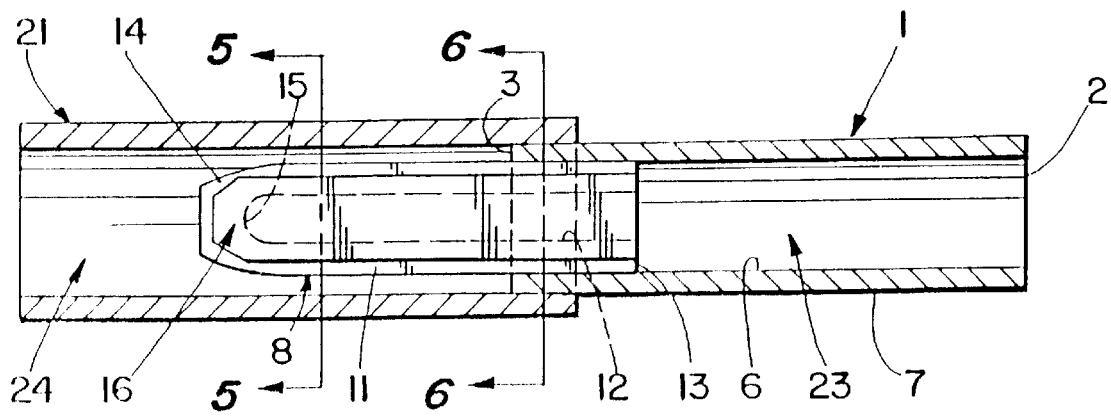
FIG. 4 is a sectional view taken along line 4—4 of FIG. 1.
Figures 5, 6:
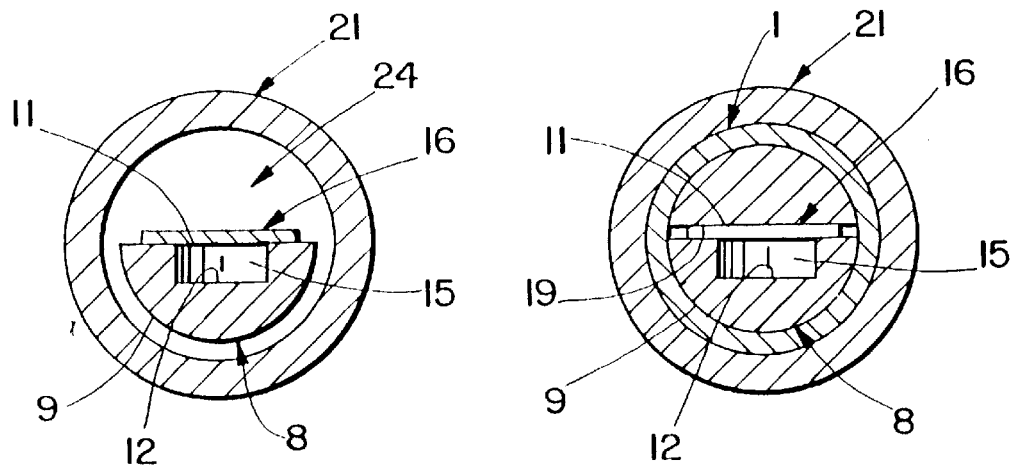
FIG. 5 is a sectional view taken along line 5—5 of FIG. 4.
FIG. 6 is a sectional view taken along line 6—6 of FIG. 4.

Referring to FIGS. 1–3 of the drawings for a clearer understanding of the invention, it should be noted that the preferred embodiment includes the first flexible tube 1 having a first end 2 and a second end 3. The first flexible tube 1 defines a predetermined interior diameter 4 and a predetermined exterior diameter 5. The first flexible tube 1 further defines a cylindrical interior surface 6 and a cylindrical exterior surface 7. A reed holder 8 is seated within the second end 3 of the first flexible tube 1. The reed holder 8 is an elongated member which defines a cylindrical side 9 formed to fit in surface abutment with the interior surface 6 of the first flexible tube 1. A reed engaging side 11 is formed opposite the cylindrical side 9 and defines a channel 12. The channel 12 runs substantially parallel to the elongated reed holder 8 from a secured end 13 of said reed holder to a tapered portion 14 of the reed holder 8 located distal to the secured end 13. The channel 12 is partially defined by end face 15 extending perpendicular to the longitudinal axis of the elongated reed holder 8. A substantially planar reed 16 is supported on the reed engaging side 11 of the reed holder 8 and is secured in pressed abutment therewith by a reed positioner 17 wedged between said interior surface 6 of the first flexible tube 1 and the reed 16. The reed positioner 17 defines a substantially cylindrical and tapered side 18 to accommodate the wedging of the reed positioner 17 within the first flexible tube 1. The reed positioner 17 also defines a planar side 19 which is urged in pressed abutment with the reed 16 to secure the reed 16 against the reed holder 8. A second flexible tube 21, having an internal diameter 22 substantially equal to the exterior of diameter 5 of the first flexible tube 1, is detachably connected to the second end 3 of the first flexible tube 1 such that the first end 2 and a portion of the reed holder 8 and reed 16 extend within the second flexible tube 21.

It will be readily apparent to one who skilled in art that other methods for detachably connecting the second flexible tube 21 to the first flexible tube 1 are available. However, because of the flexible nature of tubes 1 and 21, the preferred embodiment described a means of detachably connecting the two tubes with minimal complication.

In operation the present invention is utilized by placing the second flexible tube 21 against the user's lips (not shown). The user discharges air into the second flexible tube 21. The air passes through the second flexible tube 21 and into the channel 12. The air passing through channel 12 encounters the endface 15 and is forced upward into the second flexible tube 21 and against the reed 16. A certain degree of turbulence is created as the air contacts the end face 15. Contact of this turbulent air with the reed 16 causing the reed 16 to vibrate away from and against the reed engaging side 11 of the reed holder 8 thus creating sound. The sound resonates from the first and second flexible tubes 1 and 21.

The user may alter the tone, pitch, and resonation of the sound by linear bending of either or both the first flexible tube 1 or the second flexible tube 21. By bending the tube the degree of air flow turbulence passing through and out of the first and second tubes 1 and 21 is altered thus effecting the manner in which the reed 16 vibrates against the reed holder 8.

Further linear bending or radial deformation of the first and second tubes 1, 21 the resonance chambers 23 and 24 formed thereby respectively, are not altered only in diameter but in shape, to slightly alternate the sound emanating therefrom. Minor bends or deformations in either the first or second tube will result in subtle changes in the pitch and resonance of the sound similar to that created by an experienced game caller using previous duck calls who might subtly move his hand near the sounds discharged or subtly alter his vocal chords or cheek muscles to alter the resonance and pitch. Using the present invention, an experienced user can simply manipulate the flexible tube to accomplish the same result.

Many species, particularly duck species will emanate a high pitched squeal on occasion. This high pitched sound can be copied by more dramatic bending of the second flexible tube 21 in close proximity to the vibrating reed 16. By limiting the space between the reed holder 8 and the second flexible tube 21, the range of the reed's movement is limited thus dramatically increasing the pitch. With the second flexible tube 21 bent dramatically to increase pitch, the first flexible tube 1 may be slightly bent to subtly alter the higher pitched sound. This is just an example of how flexible tubes can be manipulated to create a wide diversity of sound.

Changing environmental factors different wildlife settings and varible distances of game animals create the need for volume control. Volume control is achieved by radial deformation of the first flexible tube 1. Radial Deformation of tube 1 effectively decreases the volume by decreasing the internal diameter 4 of flexible tube 1. This decrease in volume is directly relative to the decrease of Internal Diameter 4. Radial deformation can be applied anywhere along tube 1 by squeezing the tube between the index finger and thumb or any other practical method of decreasing internal diameter 4.

Figure 7:
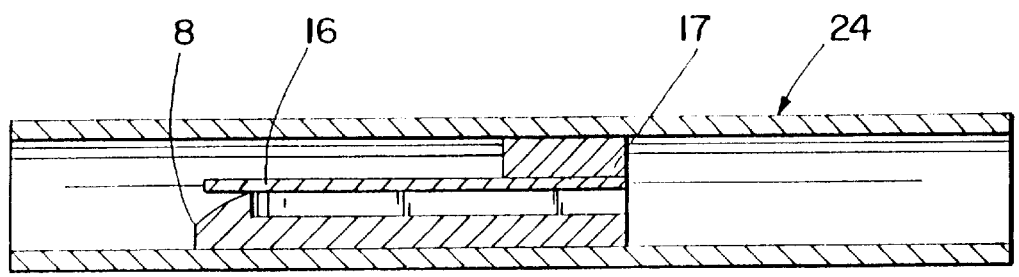
FIG. 7 is a sectional view of the second embodiment of the present invention.
Figure 8:
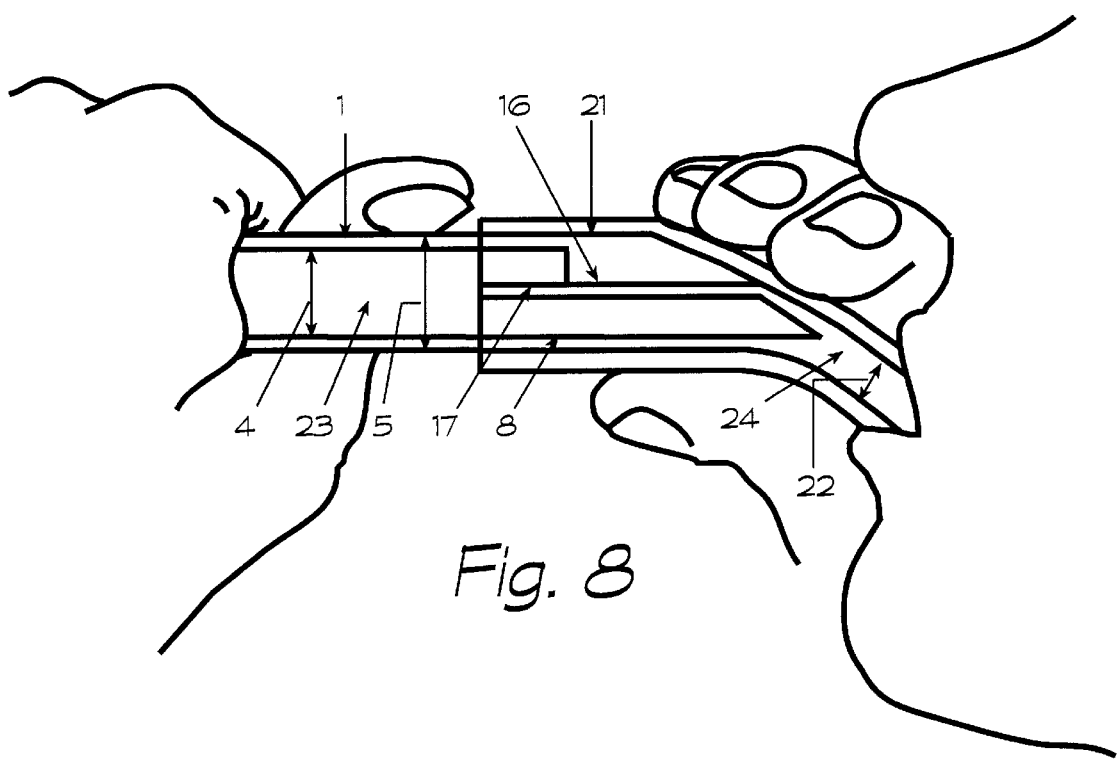
FIG. 8 is a sectional view showing the second flexible tube being bent in close proximity to the reed.
Figure 9:
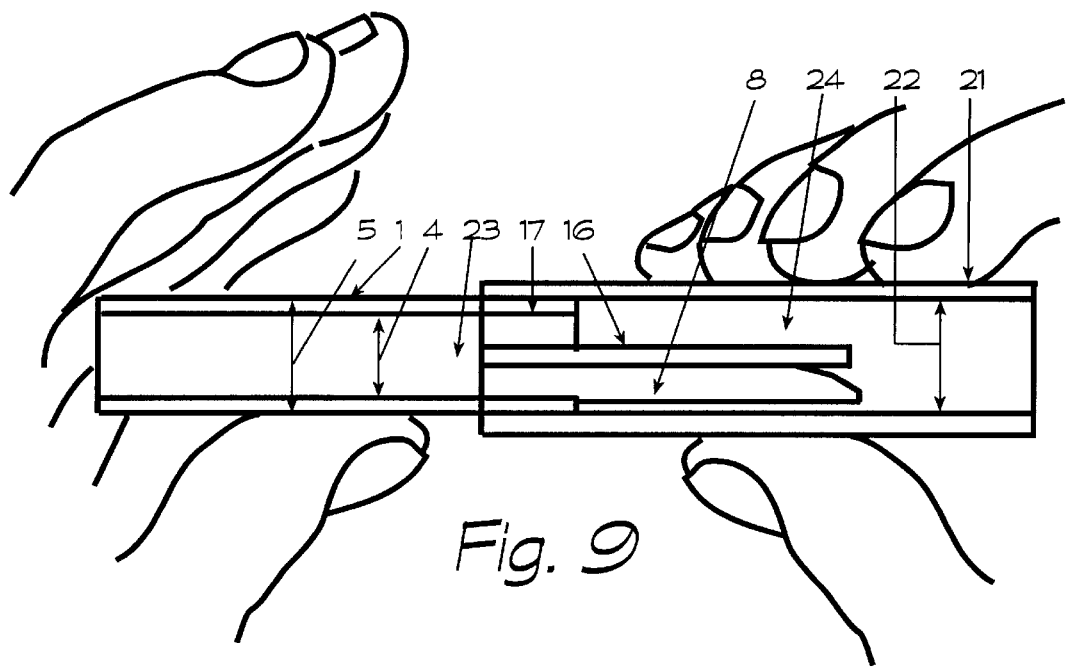
FIG. 9 is a sectional view of the present invention showing the user's hands holding the present invention.
Figure 10:
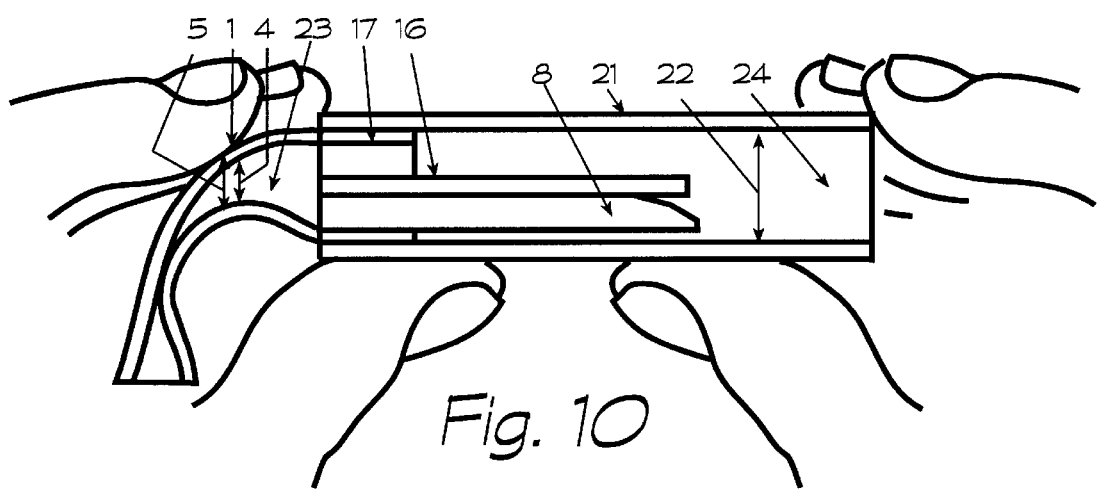
FIG. 10 is a sectional view of the present invention showing the first flexible tube manipulated by the user to collapse the interior diameter thereof.

A second embodiment of the present invention is shown in FIG. 7. Instead of the first and second tubes 1 and 21 shown in the first embodiment, the second embodiment includes a single tube 24 having the reed 16, reed holder 8 and reed positioner 17 engaged therein. The second embodiment function in the same manner as the first, only providing an alternate and possible cheaper mode of manufacture.

It should be readily apparent that the methods for the cleaning and replacement of the reed 16 is more easily facilitated with the first embodiment.

While I have shown my invention in two (2) forms, it will be obvious to those skilled in the art that it is not so limited but is acceptable in various changes and modifications without departing from the spirit thereof.

What I claim is:

1. An apparatus for calling a variety of game comprising an elongated, flexible and elastic tube capable of radial deformation and linear bending and vibrating means seated within said tube for generating sounds designed to call a variety of game when subject to air passing though it, wherein said vibrating means is centered within said flexible and elastic tube such that said flexible and elastic tube extends from said vibrating means in two directions and wherein said flexible and elastic tube extends a sufficient distance from said vibrating means in both directions to accommodate radial deformation and linear bending of said flexible and elastic tube, causing the sound generated by air passing through it to be altered and wherein said flexible and elastic tube, when released, will return to and maintain its original shape.

2. An apparatus for calling a variety of wild game, having different instinctive calls, comprising:
   a. a first flexible and elastic tube having a first end and second end, capable of radial deformation and linear bending as a result of the user squeezing or bending in any direction, causing the internal diameter of said first flexible and elastic tube to be altered relative to the amount of radial deformation or linear bending applied to said first flexible and elastic tube; wherein said first flexible and elastic tube, when released, will return to and maintain its original shape; and
   b. a vibration means, seated within said second end of said first tube, for generating sounds designed to call a variety of game, when subjected to a flow of air passing through;
   c. a second flexible and elastic tube capable of radial deformation and linear bending as a result of the user squeezing or bending in any direction, connected to said second end of said first tube and encasing said vibration means, wherein said first and said second flexible and elastic tubes extend in opposite directions from said vibration means and wherein said first and second flexible and elastic tubes are of sufficient length to accommodate radial deformation, and linear bending of said first and second flexible and elastic tubes, either individually or together, and wherein said flexible and elastic tubes, when released, will return to and maintain their original shape.

3. An apparatus as described in claim 2 wherein said second tube is disengagably connected to said first tube.

4. An apparatus as described in claim 2 wherein said second end of said first tube is disengagably seated within said second tube.

5. An apparatus as described in claim 2 wherein said first tube defines an interior diameter that is smaller than an internal diameter defined by said second tube.

6. An apparatus as described in claim 2 wherein sound, generated by airflow passing though said second flexible and elastic tube and said vibrating means, can be controlled in volume by radial deformation or linear bending of said first flexible and elastic tube, causing a decrease in airflow though said first flexible and elastic tube and is relative to the decrease of the internal diameter of said first flexible and elastic tube caused by the radial deformation or linear bending.

7. An apparatus as described in claim 2 wherein said vibrating means comprises:
   a. a reed holder seated within said second end of said first tube and extending therefrom and within said second tube;
   b. a flexible reed supported by and extending substantially parallel to said reed holder from said first tube and within the second tube; and c. a reed positioner seated within said first tube and against said reed to urge said reed in pressed abutment with said reed holder.

8. An apparatus as described in claim 7 wherein said reed holder comprises an elongated member having a cylindrical side contoured to fit in surface abutment with an interior surface of said first tube, a reed engaging side opposite said cylindrical side and against said reed which is secured in pressed abutment with said reed positioner, wherein said reed engaging side defines a channel running substantially parallel to said reed holder from a secured end of said reed holder, within said first tube to a tapered portion of said reed holder defined thereby and within said second tube such that air passing through said first and second tubes may flow between said reed and said reed holder.

9. An apparatus as described in claim 8 wherein said reed positioner is cross-sectionally semi-circular such that airflow passing through said first tube must pass exclusively through said channel when said vibrating means is seated within said first tube.

10. An apparatus as described in claim 8 wherein said reed comprises a substantially flat elastic strip which is agitated by turbulent airflow passing through said channel causing said reed to vibrate against said reed holder to create a sound, wherein said turbulent airflow may be altered by radial deformation or linear bending of either said first or second tube and wherein severe linear bending or radial deformation of said second tube can alter said sound by urging the internal surface of said second tube in contact with said vibrating reed decreasing the length of vibration and effectively increasing the pitch.

* * * * *